Aug. 18, 1964 T. J. WEIR 3,144,922
TEMPERATURE AND SPEED RESPONSIVE FLUID COUPLING
Filed April 5, 1962 3 Sheets-Sheet 2

INVENTOR.
THOMAS J. WEIR
BY
Lockwood, Woodard, Smith & Weikart
Attorneys

United States Patent Office 3,144,922
Patented Aug. 18, 1964

3,144,922
TEMPERATURE AND SPEED RESPONSIVE
FLUID COUPLING
Thomas J. Weir, Indianapolis, Ind., assignor to Schwitzer Corporation, Indianapolis, Ind., a corporation of Indiana
Filed Apr. 5, 1962, Ser. No. 185,380
5 Claims. (Cl. 192—58)

This invention relates generally to fluid coupling devices, and more particularly, to a fluid coupling adapted to drive an accessory device, such as a cooling fan, for an internal combustion engine, the coupling being responsive both to temperaure and to the input speed.

Automotive vehicles, such as passenger automobile and buses are being provided with air conditioning equipment, the condensing element of such equipment being mounted in front of the cooling radiator of the engine. The air flowing through the condensing element is heated thereby and then flows through the cooling radiator of the engine, thereby effecting the cooling characteristics of the radiator. Accordingly, the size of the cooling fan and its speed of rotation have been increased to provide adequate volume of cooling air. As a result, the parasitic load on the engine has been increased and the noise of fan operation has risen to an objectionable level.

To compensate for these effects the cooling fan of the engine is provided with a fluid coupling device having temperature responsive means controlled either by the temperautre of the air flowing through the radiator or by the temperature of the water circulating through the engine cooling system. The degree of coupling between the fan and the engine is controlled by the temperature responsive means to provide substantially direct coupling of the fan to the engine when the air or the cooling water is at relatively high temperatures and to effect a certain degree of slip within the coupling to drive the fan at lower than normal speeds when the temperature of the air or cooling water is relatively low. These temperature variable couplings have the advantage of decreasing the power supplied to the fan by the engine when less air is needed for cooling purposes. This type of variable coupling also results in a minimum of fan noise since the fan speed is reduced except when necessary to provide proper heat exchange.

In conventional devices of the type referred to above, for a given input speed to the coupling the fan speed or degree of coupling increases with increase in temperature of the air moving past the thermally responsive element along a characteristic curve. For increased input speeds this characteristic curve attains a somewhat increased slope, but the variation in slope of the characteristic curve for increased input speeds is not pronounced. Under certain operating conditions it is highly desirable that, for increased input speeds, the fan speed or degree of coupling increase exponentially with increases in the air temperature ambient to the thermally responsive element of the coupling. It is further desirable that this exponential relation between fan speed or degree of coupling and air temperature occur only at a predetermined high input speed without disturbing the more linear fan speed-air temperature relationship at lower input speeds.

The principal object of this invention is to provide a fluid coupling unit which includes means to control the degree of coupling therein in response to both input or driving speed and the temperature ambient to a temperature responsive element.

A further object of the present invention is to provide a fluid coupling unit of the type referred to in which the normal output speed to ambient temperature relationship is not disturbed by the presence of an input speed responsive means which functions to establish an exponential relationship between coupling output speed and ambient temperature at relatively high input speeds to the coupling.

The structure of the present invention, in general, provides a fluid coupling element comprising a casing having a fluid reservoir therein and a fluid chamber for accommodating a driven disc, the casing being adapted to support an engine cooling fan or to be coupled to any desired form of accessory device. A valve mechanism is provided which is operable to control the flow of fluid between the reservoir and the chamber, the valve mechanism being operated by both temperature responsive means and speed responsive means. The amount of fluid within the chamber and the degree of coupling between the disc and the casing is thus controlled in response to temperature and, above a predetermined input speed, is controlled jointly by the magnitude of input speed and temperature.

These and other objects will become apparent as the description proceeds with reference to the accompanying drawings in which.

Figure 1:
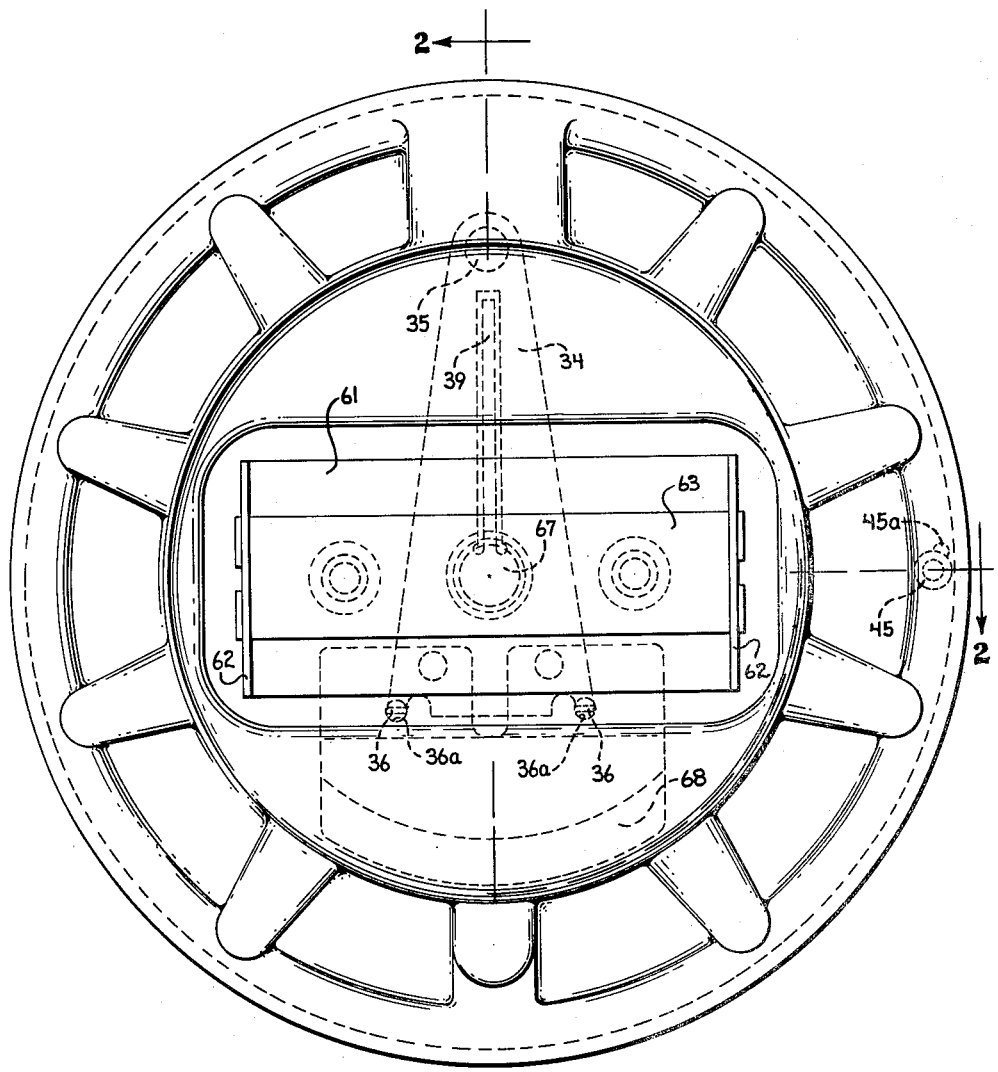
FIG. 1 is a front elevation of the fluid drive coupling device embodying the present invention.
Figure 2:
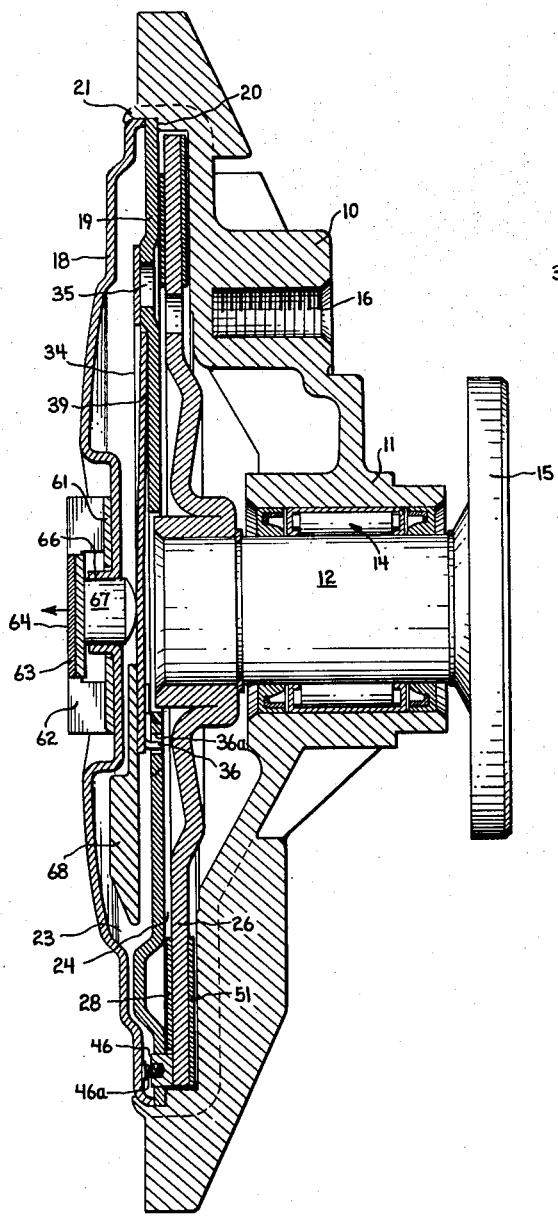
FIG. 2 is a cross-section taken generally along the line 2—2 of FIG. 1.

Referring initially to FIGS. 1-4, the invention is embodied in a fluid coupling unit comprising a casing member 10 having a hub 11 for rotatably mounting the casing on a drive shaft 12, there being a conventional sealed bearing assembly 14 for supporting the casing on the shaft. Shaft 12 may be integrally connected with a coupling flange 15 for coupling the drive shaft 12 to any convenient rotating part of an internal combustion engine. If the coupling unit is utilized for driving a cooling fan, the blades of the fan may be bolted to casing 10 by means of bolts threadedly engaging a plurality of radially disposed threaded bores 16 and the member 15 may be connected to the pulley which conventionally drives the engine water pump.

Figure 3:
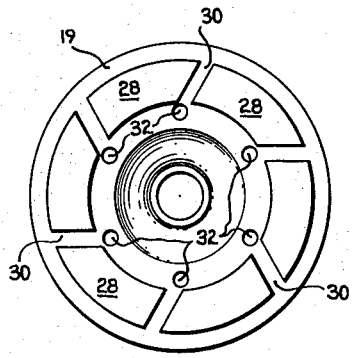
FIG. 3 is a side elevation, in reduced scale, of the drive disc taken from the left-hand side of FIG. 2.
Figure 4:
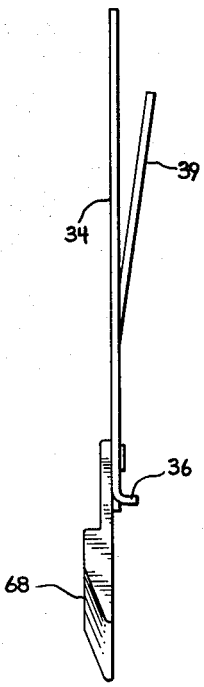
FIG. 4 is a side view of one of the components shown in FIGS. 1 and 2.

Casing 10 is provided with a cover member 18, the peripheral edges of which engage the peripheral edges of a divider plate 19 (FIG. 2) seated on an annular surface 20 formed adjacent the periphery of casing 10. Cover member 18 and plate 19 may be clamped to casing member 10 by means of an annular flange member 21 swaged or otherwise formed into pressure engagement with the outer peripheral surface of the cover 18. Cover 18 is formed and mounted to establish spaced relation with respect to the divider plate 19 thus providing a fluid reservoir 23 between cover 18 and plate 19. The casing 10 is formed to provide a recess inwardly of plate 19 to thereby provide a drive chamber 24 within which is mounted the drive disc 26. Shaft 12 carries disc 26 which may be press-fitted or otherwise fixed to the end of shaft 12 whereby rotation of the shaft causes the disc to rotate within the chamber 24. The peripheral portions of the disc 26 are covered with arcuate facing members 28 and 51 which may be spaced from one another, as shown in FIG. 3, to provide grooves or channels 30 extending between the outer portion of the facing members 28 and 51 inwardly the entire width of the facing members. Grooves 30 provide toroidal circulation of fluid because of the provision of ports 32 located at the inner ends of each one of the grooves 30. This means of providing toroidal circulation of fluid is fully described in my United States Letters Patent No. 2,879,755 granted March 31, 1959.

For controlling the flow of fluid from reservoir 23 into the drive chamber 24 there is provided an elongated valve member 34 extending at its outer end over an aperture or port 35 in the plate 19 and at its other end having finger members 36 seated in apertures 36a in the plate 19. The finger members provide a pivot for valve member 34 which is on the opposite side of the center line of the shaft 12 with respect to the port 35. As may best be seen in FIGS. 2 and 4 the valve member 34 includes resilient means in the form of a spring finger 39 formed to engage the adjacent face of the plate 19 for biasing the valve member 34 away from, and out of seating engagement with the port 35. Mounted on the exterior face of the cover 18 is a generally U-shaped bracket 61 having outwardly extending portions 62 at each of its extremities. The central section of each of the outwardly turned portions 62 is cut away to accommodate the tips of a thermally responsive means in the form of a bimetal strip 63. The bimetal strip is arranged so that its high expansion side 64 faces outwardly. When so arranged it will be evident that upon an increase in temperature ambient to the bimetal strip, the central portion of the strip will bow outwardly as indicated by the arrow in FIG. 2. Beneath the center of the bimetal strip the cover 18 is apertured and the area surrounding the aperture is flanged outwardly as indicated at 66. The outwardly flanged portion encircles a thrust member 67 which at one end bears against the inner face of the bimetal strip 63 and at its other end engages the valve member 34. As will be evident from FIG. 2 the arrangement of the bimetal strip 63 with relation to the thrust member is such that the bimetal strip mechanically exerts a force on the valve member 34 which is sufficient to seat the valve member against the port 35 and to overcome the opposing force of the resilient spring finger 39. The force exerted by the bimetal strip tending to move the valve member 34 into seating relation with the port 35 is thus inversely proportional to the temperature ambient to the bimetal strip.

Secured to the lower end of the valve member 34 and extending below the pivot formed by the members 36 is a weight 68. The weight 68 is shaped so that its center of gravity is leftward (as viewed in FIG. 2) of the pivot formed by the extension of the members 36 into the apertures 36a so that upon rotation of the divider plate 19 upon which the member 34 is mounted, centrifugal force acting upon the weight 68 will provide a moment which tends to rotate the valve member 34 counterclockwise (as viewed in FIG. 2) about the pivot fingers 36. Centrifugal force acting on the weight 68 thus provides a resultant force, increasing exponentially with increases in rotational speed, which tends to move the valve member 34 away from seating relation with the port 35, this force aiding the force exerted by the resilient means 39.

It will be understood that the rotational speed of the casing 10 as compared to the rotational speed of the shaft 12, that is, the degree of coupling between the two, is dependent upon the amount of fluid in the chamber 24 and the volume of fluid in the chamber 24 is dependent on the rate of flow of fluid from the reservoir 23 through the port 35. Means are provided for permitting flow of fluid out of the chamber 24 which includes an aperture 45 in plate 19 adjacent the periphery thereof. As will be evident from FIG. 1, the aperture 45 is not completely circular in outline but includes an additional aperture portion 45a which is semi-circular in cross-section and provides communication between chamber 24 and reservoir 23. Freely movable within the aperture 45 is a cylindrical block 46 formed of wear-resistant material. The member 46 is urged into engagement with the adjacent side face of the drive disc 26 by means of a small compression spring 46a which extends between a seat in the block and the adjacent inner face of the cover 18. Fluid may flow from the reservoir 23 through the port 35 when it is open and into chamber 24. Fluid may flow from the chamber 24 through the drain aperture portion 45a back into the reservoir 23. The block 46, spring biased into engagement with the adjacent face of the drive disc 26, serves to force fluid flow through the aperture portion 45a. It will be noted that the facing members 28, which are adjacent the inner surface of the plate 19, do not extend all the way to the circumferential edge of the disc 26 leaving a space on the disc surface wherein the member 46 may directly engage the disc. Upon rotation of the case centrifugal force causes the fluid in the drive chamber 24 to collect in the area in front of the block 46 creating pressure sufficient to force flow of fluid through the aperture portion 45a.

Figure 5:
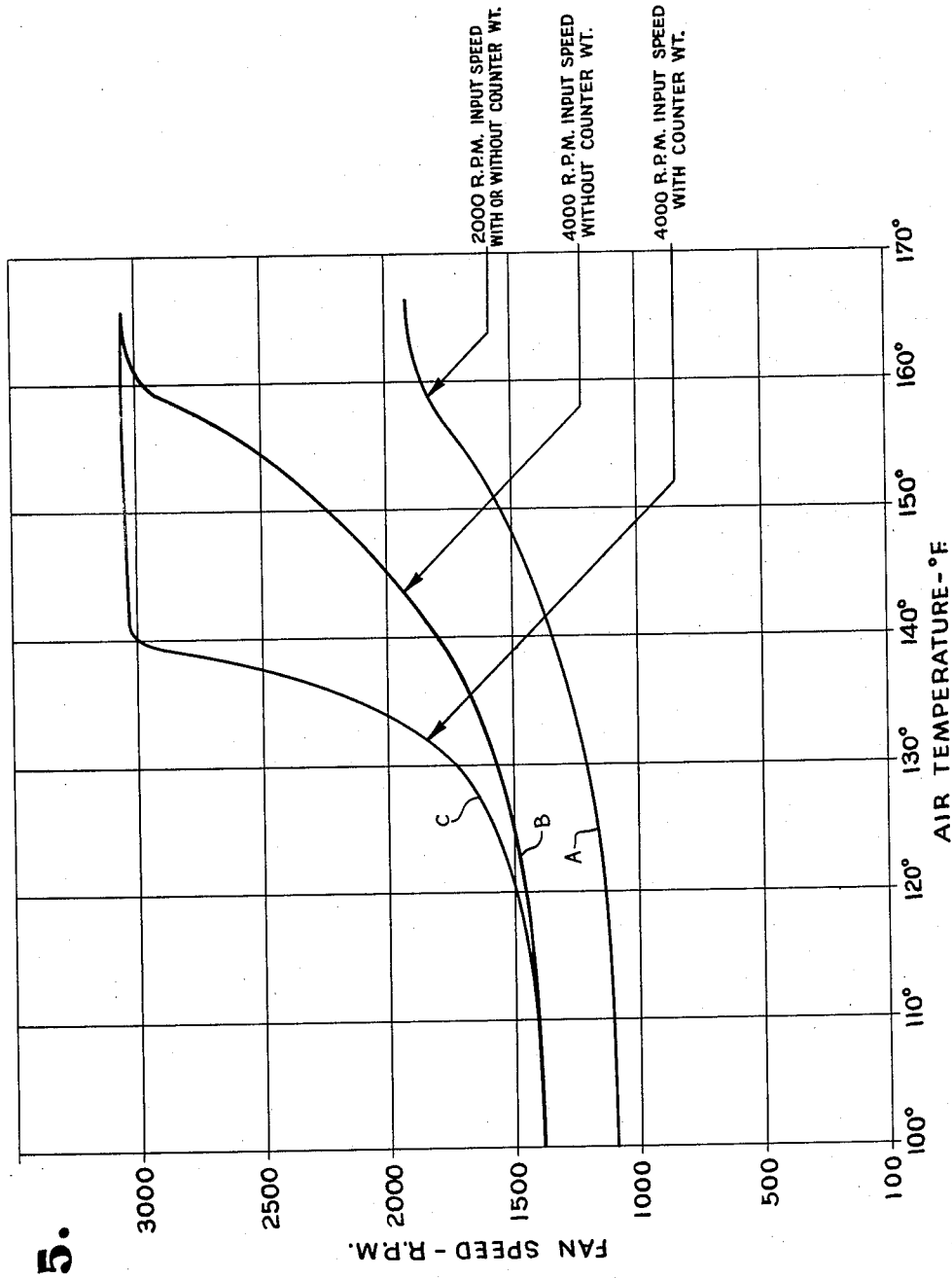
FIG. 5 is a diagram illustrating the output speed-temperature relationship for a coupling embodying the present invention and for a typical coupling omitting certain of the structure of the present invention.

In operation reservoir 23 may be filled with a fluid such, for example, as an oil to a degree sufficient to fill the spaces in chamber 24 between the opposing surfaces of the facings 28 and 51 and the adjacent walls of plate 19 and casing 10. Sufficient fluid is also required to maintain the same level in reservoir 23 as that in chamber 24 during operation of the coupling. Referring to FIG. 5 the curve identified at A indicates the fan or casing speed (output speed) to ambient temperature relationship for the coupling when the input speed is relatively low, for example, 2,000 r.p.m. From curve A it will be evident that the output speed increases at a substantially linear rate with increases in the temperature of the air moving past the bimetal member 63 until the maximum output speed is reached. At speeds of the 2,000 r.p.m. magnitude centrifugal force acting on the weight 68 creates a moment tending to urge the valve member 34 away from the port 35, however, this moment has substantially no effect on the position of the valve member, the curve A being substantially the same for the 2,000 r.p.m. input speed when the weight 68 is omitted from the coupling assembly. The curve identified at B in FIG. 5 indicates the output speed-ambient temperature relationship for a coupling assembly omitting the weight 68 but operated at an input speed of 4,000 r.p.m. From an inspection of curve B it will be evident that at this elevated input speed, the output speed increases somewhat more rapidly with increases in ambient temperature, however, the rate of increase is still substantially linear. The curve identified at C in FIG. 5 illustrates the output speed-air temperature relationship for a coupling embodying the present invention and operated at 4,000 r.p.m. input speed. An inspection of curve C will indicate that the speed of rotation of the case, that is, the fan or output speed is relatively low at lower temperatures. At the relatively low temperatures, and consequently relatively low output speed, the mechanical strength of the bimetal strip 63 is sufficient to overcome the force exerted by the spring finger 39 and the force moment generated by centrifugal force acting on the weight 68. As the temperature increases, the force exerted by the bimetal strip 63 tending to urge the valve member toward closed position is reduced. As this force is reduced the combined constant force of the spring finger 39 and the force moment generated by centrifugal force on the weight 68 begins to open the port 35. As the temperature continues to rise the force exerted by the bimetal strip 63 in port closing direction continues to decrease. With the opening of the port 35 the output speed increases and this increased output speed provides an exponential increase in the force moment resulting from centrifugal force acting on the weight 68 tending to further open the port 35. The reduction in closing force exerted by the bimetal strip 63, the exponential increase in the centrifugal force moment and the relatively constant force exerted by the spring finger 39 result in the top output speed for the coupling being reached very rapidly and at a lower ambient temperature than is the case for the structures whose output-air temperature relationship is indicated at curves A and B.

It will thus be evident that for relatively low input speeds the output speed-ambient temperature relationship of a coupling embodying the present invention is substantially linear as illustrated by curve A. At elevated input speeds of the order of 4,000 r.p.m. fan speed or output speed increases exponentially with increases in ambient air temperature and the maximum output speed for the coupling is reached relatively quickly. The force moment created by centrifugal force acting on the weight 68 thus overrides or recalibrates the response of the thermally responsive member at high input speeds. The degree of coupling between the input shaft and the casing is thus increased rapidly with increases in temperature ambient to the thermally responsive member.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed:

1. A fluid coupling device comprising a drive shaft, an outer casing rotatably mounted on said shaft, said casing having a divider plate therein separating the space within said casing into a fluid reservoir and a drive chamber, a drive disc mounted on said shaft within said drive chamber, said drive disc having surfaces disposed in close face-to-face and spaced relation with surfaces of said plate and outer casing, an aperture in said plate providing a port opening into said reservoir and into said drive chamber for filling the spaces between said disc, plate and casing surfaces with fluid from said reservoir to create fluid drive coupling of said casing and said disc, the degree of coupling therebetween varying with the volume of fluid in said drive chamber, a drain aperture in said plate for draining fluid from said drive chamber to said reservoir, a valve member having a portion overlying said port and pivotally mounted on said divider plate for movement into and out of seating relation with said port, temperature responsive means mounted exteriorly of said outer casing having means extending within said casing cooperating with said valve member to exert a force thereon urging said valve member into seating relation with said port, said force varying inversely with changes in the temperature ambient to said temperature responsive means, resilient means urging said valve member away from seating relation with said port, and a weight mounted on said valve member and responsive to centrifugal forces created by rotation of said casing for urging said valve member away from seating relation with said port, whereby at elevated shaft speeds the centrifugal force generated by the presence of said weight substantially aids the force exerted by said resilient means in opposing the force exerted by said temperature responsive means to thereby establish an exponential increase in the degree of coupling between said shaft and said casing with increase in said temperature, and at reduced shaft speeds there is maintained a substantially linear relation between the degree of coupling and increases in said temperature.

2. A fluid coupling device comprising a drive shaft, an outer casing rotatably mounted on said shaft, said casing having a divider plate therein separating the space within said casing into a fluid reservoir and a drive chamber, a drive disc mounted on said shaft within said drive chamber, said drive disc having surfaces disposed in close face-to-face and spaced relation with surfaces of said plate and outer casing, an aperture in said plate providing a port opening into said reservoir and into said drive chamber for filling the spaces between said disc, plate and casing surfaces with fluid from said reservoir to create fluid drive coupling of said casing and said disc, the degree of coupling therebetween varying with the volume of fluid in said drive chamber, a drain aperture in said plate for draining fluid from said drive chamber to said reservoir, a valve member having a portion overlying said port and pivotally mounted on said divider plate for movement into and out of seating relation with said port, temperature responsive means cooperating with said valve member to exert a force thereon urging said valve member into seating relation with said port, said force varying in response to changes in the temperature ambient to said temperature responsive means, resilient means urging said valve member away from seating relation with said port, and a weight mounted on said valve member and responsive to centrifugal forces created by rotation of said casing for urging said valve member away from seating relation with said port, whereby at elevated shaft speeds the centrifugal force generated by the presence of said weight substantially aids the force exerted by said resilient means in opposing the force exerted by said temperature responsive means to thereby establish an exponential increase in the degree of coupling between said shaft and said casing with increase in said temperature, and at reduced shaft speeds there is maintained a more linear relation between the degree of coupling and increases in said temperature.

3. A fluid coupling device comprising a drive shaft, an outer casing rotatably mounted on said shaft, said casing having a wall therein separating the space within said casing into a fluid reservoir and a drive chamber, a drive member mounted on said shaft within said drive chamber, said drive member having surfaces disposed in close face-to-face and spaced relation with surfaces of said wall and outer casing, an aperture in said wall providing a port opening into said reservoir and into said drive chamber for filling the spaces between said drive member, wall and casing surfaces with fluid from said reservoir to create fluid drive coupling of said casing and said drive member, the degree of coupling therebetween varying with the volume of fluid in said drive chamber, a drain aperture in said wall for draining fluid from said drive chamber to said reservoir, a valve member having a portion overlying said port and pivotally mounted for movement into and out of seating relation with said port, temperature responsive means cooperating with said valve member to exert a force thereon urging said valve member into seating relation with said port, said force varying in response to changes in the temperature ambient to said temperature responsive means, resilient means urging said valve member away from seating relation with said port, and a weight cooperating with said valve member and responsive to centrifugal forces created by rotation of said casing for urging said valve member away from seating relation with said port, whereby at elevated shaft speeds the centrifugal force generated by the presence of said weight substantially aids the force exerted by said resilient means in opposing the force exerted by said temperature responsive means to thereby establish an exponential increase in the degree of coupling between said shaft and said casing with increase in said temperature, and at reduced shaft speeds there is maintained a more linear relation between the degree of coupling and increases in said temperature.

4. A fluid coupling device comprising a drive shaft, an outer casing rotatably mounted on said shaft, said casing having a wall therein separating the space within said casing into a fluid reservoir and a drive chamber, a drive member mounted on said shaft within said drive chamber, said drive member having surfaces disposed in close face-to-face and spaced relation with surfaces of said wall and outer casing, an aperture in said plate providing a port opening into said reservoir and into said drive chamber for filling the spaces between said drive member, wall and casing surfaces with fluid from said reservoir to create fluid drive coupling of said casing and said drive member, the degree of coupling therebetween varying with the volume of fluid in said drive chamber, a drain aperture in said plate for draining fluid from said drive chamber to said reservoir, a valve member having a portion overlying said port and mounted for movement into and out of seating relation with said port, temperature responsive means cooperating with said valve member to exert a force thereon urging said valve member into seating relation with said port, said force varying in response to changes in the temperature ambient to said temperature responsive means, and a weight cooperating with said valve member and responsive to centrifugal forces created by rotation of said casing for urging said valve member away from seating relation with said port, whereby at elevated shaft speeds the centrifugal force generated by the presence of said weight opposes the force exerted by said temperature responsive means to thereby establish an exponential increase in the degree of coupling between said shaft and said casing with increase in said temperature, and at reduced shaft speeds there is maintained a more linear relation between the degree of coupling and increases in said temperature.

5. A fluid coupling device comprising a shaft, an outer casing rotatably mounted on said shaft, said casing having a wall therein separating the space within said casing into a fluid reservoir and a drive chamber, a coupling member mounted on said shaft within said drive chamber, said coupling member having surfaces disposed in close face-to-face and spaced relation with surfaces of said wall and outer casing, an aperture in said wall providing a port opening into said reservoir and into said drive chamber for filling the spaces between said coupling member, wall and casing surfaces with fluid from said reservoir to create fluid drive coupling of said casing and said coupling member, the degree of coupling therebetween varying with the volume of fluid in said drive chamber, a drain aperture in said wall for draining fluid from said drive chamber to said reservoir, a valve member having a portion overlying said port and mounted for movement into and out of seating relation with said port, temperature responsive means cooperating with said valve member to exert a force thereon urging said valve member into seating relation with said port, said force varying in response to changes in the temperature ambient to said temperature responsive means, and a weight cooperating with said valve member and responsive to centrifugal forces created by rotation of said casing for urging said valve member away from seating relation with said port, whereby at elevated shaft speeds the centrifugal force generated by the presence of said weight opposes the force exerted by said temperature responsive means to thereby establish an exponential increase in the degree of coupling between said shaft and said casing with increase in said temperature, and at reduced shaft speeds there is maintained a more linear relation between the degree of coupling and increases in said temperature.

References Cited in the file of this patent
UNITED STATES PATENTS

| | | |
|---|---|---|
| 2,902,127 | Hardy | Sept. 1, 1959 |
| 3,055,473 | Oldberg et al. | Sept. 25, 1962 |
| 3,077,566 | Fleming | May 7, 1963 |